Patented Apr. 12, 1938

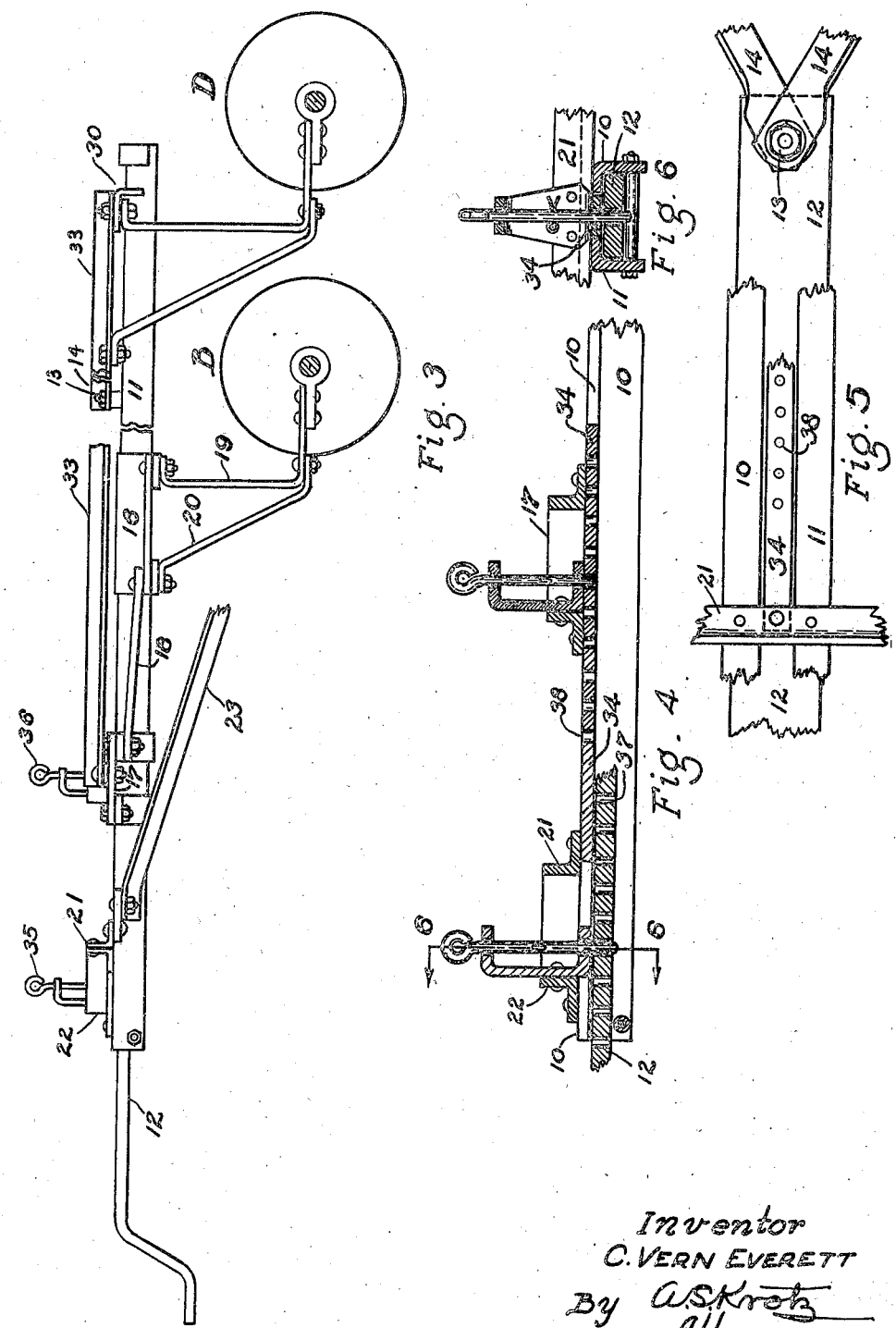

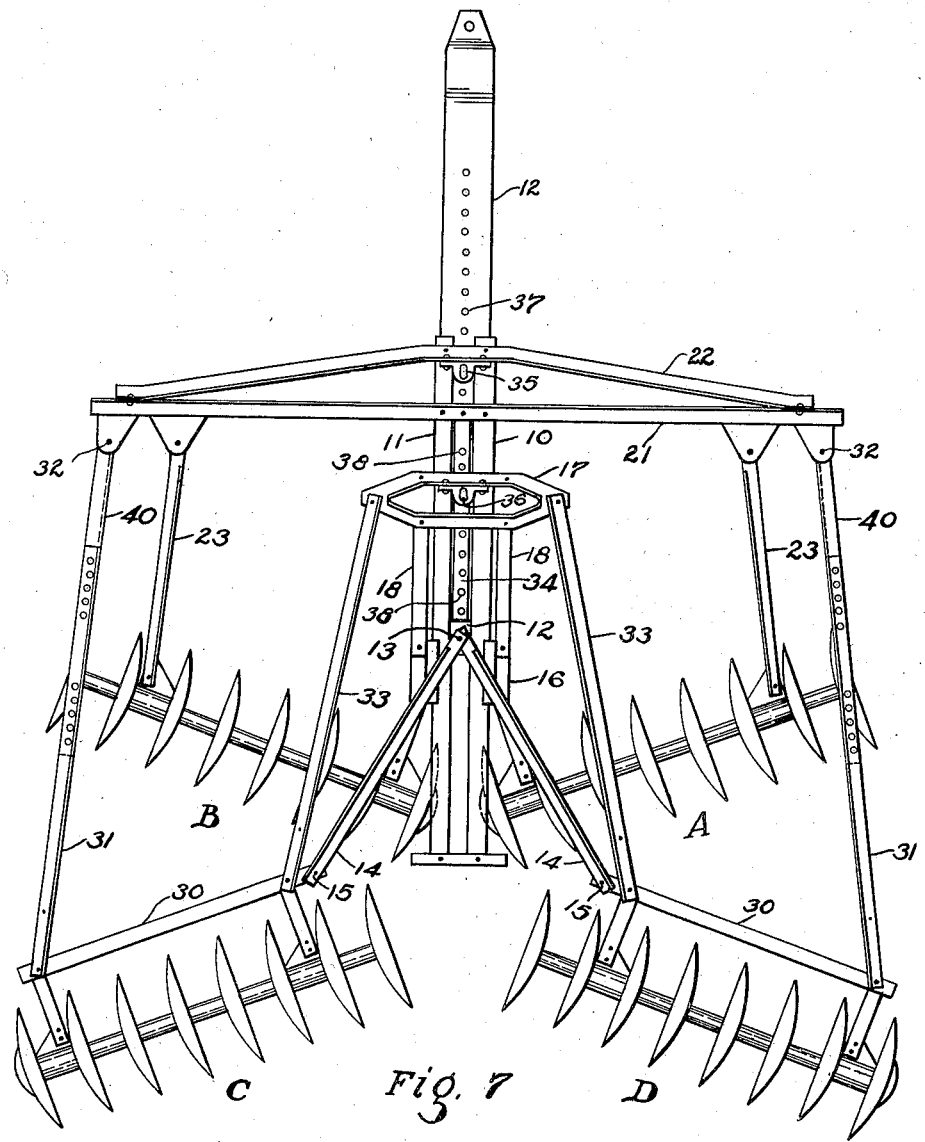

2,113,832

UNITED STATES PATENT OFFICE 2,113,832

COMBINED WIDE AND TANDEM DISK HARROW

Charles Vern Everett, Racine, Wis., assignor to The Massey-Harris Company, Racine, Wis.

Application June 4, 1937, Serial No. 146,427

7 Claims. (Cl. 55—83)

The modern farm tractor will pull a disk harrow of considerably greater width than will pass through the average gate or over the average culvert. It is therefore desirable to provide a harrow that can be conveniently narrowed for this purpose. However, there is considerable use for what is known as tandem disk harrows.

In the present invention I provide a wide harrow that can be conveniently reduced in width for the purpose of passing through gates and over culverts, the same harrow being adapted to be readily changed into a tandem disk harrow.

An object of the present invention is to provide a harrow which may be conveniently narrowed and made wide again by a forward or rearward movement of the tractor, and whereby the angle of the gangs may also be conveniently changed by a forward or rearward movement of the tractor.

A further object of the present invention is to provide a narrow wide type of harrow which may be made into a tandem harrow without making changes of any kind except to lengthen two of the draw bars and move the rear gangs to opposite sides of the device.

One of the objects of the present invention is to provide a frame structure which is neat, light, strong, easily adjusted, simple, and easily knocked down for shipment.

I accomplish these objects by providing a novel frame structure having long parallel acting draw bar connections for the gangs. The inside connections for the gangs are secured at their front ends to a member which is slidably mounted on the frame, whereby the action of the tractor may be used for narrowing and widening the rear gangs and whereby the angle of the gangs may be changed by the movement of the tractor.

To these and other useful ends my invention resides in features of construction, the mode of operation, the parts and combinations thereof or their equivalents as hereinafter described and claimed and shown in the accompanying drawings in which:

Fig. 3 is a fractional side elevation of the harrow as shown in Figure 2.

Fig. 4 is an enlarged fractional side view of the frame member.

Fig. 5 is an enlarged fractional top view of the frame member.

Fig. 6 is a sectional view taken on line 6—6 of Figure 4.

Fig. 7 is a top plan view of the device after having been changed to a tandem harrow.

Figure 1:
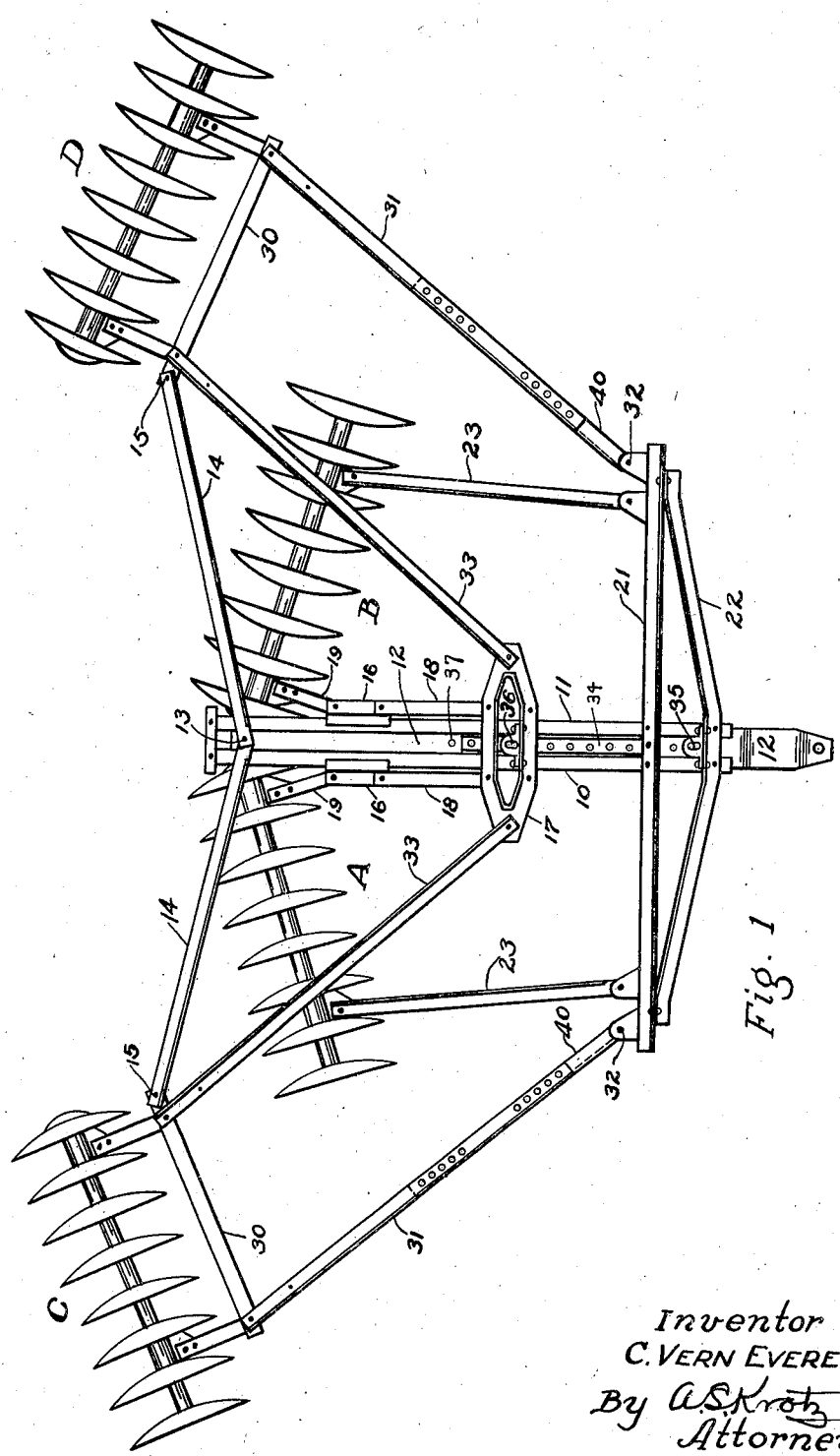
Fig. 1 is a top plan view of the harrow when in its wide adjustment.

As thus illustrated, the front disk gangs are designated in their entirety by reference characters A and B and the rear disk gangs are designated in their entirety by reference characters C and D. Gangs A and B are adapted to be held in the same working position as an ordinary single disk harrow wherein the dirt is thrown outward by the disks, and gangs C and D are similarly positioned except the inside disk is made to almost follow the outside end disks of the front gangs (see Fig. 1). This position however may be changed slightly by changing the working position of the slidable draw bar or by changing the length of the spacing links as will hereinafter appear. As a matter of convenience I have shown the gangs as each having eight disks.

The main frame of the device consists of preferably two spaced angle bars 10 and 11 having mounted thereon a slidable draw bar 12 which is adapted to be attached to the tractor draw bar. At the rear end of draw bar 12 I provide a bolt 13, to which links 14—14 are loosely secured. The out ends of these links are loosely secured to gangs C and D as at 15—15. A frame member 16 is slidably mounted on draw bar members 10 and 11 and another slidably mounted member 17 is provided having link connections 18—18 therebetween. The inner bearings of gangs A and B are flexibly connected to member 16 by means of posts 19—19 having braces 20—20. Thus the inside ends of gangs A and B may be moved forward and rearward by moving the sliding members 16 and 17 forward or rearward.

I provide a transverse frame member 21 having a brace 22. These members are secured to frame bars 10 and 11 and answer as a draw bar connection for the outer ends of the four gangs. The outer ends of gangs A and B are secured to member 21 by means of draw bar links 23—23.

I provide draw bar connections for the rear gangs as follows: Frame bars 30—30 are secured to the gang bearings in the usual manner thus to form gang frames, the outer ends being pivotally secured to the draw bar members 31—31 which are in turn pivotally secured to the outer ends of member 21 as at 32—32. Sliding member 17 is operatively connected to the inner ends of gangs C and D by means of draw bars 33—33. Thus it will be seen that gangs C and D may move outwardly and inwardly in parallel relation and that they will be held in their wide position by means of links 14 so long as member 12 is held in its rear position.

I provide a bar 34 which is secured to member 21 as clearly indicated in Figure 5. This bar is provided with a number of orifices 38. I provide a linch-pin 36 which is slidably mounted on member 17 as illustrated in Figure 4 and is long enough when in its lowest position to engage one of the orifices in bar 34. Thus it will be seen that members 16 and 17 may be located in various selective positions on members 10 and 11 so as to fix the position of the inside ends of the four gangs or in other words, to fix the angle of the gangs. It will be seen that by disengaging pin 36 and moving the tractor forward or backward, the angles of the four gangs may be changed.

Figure 2:
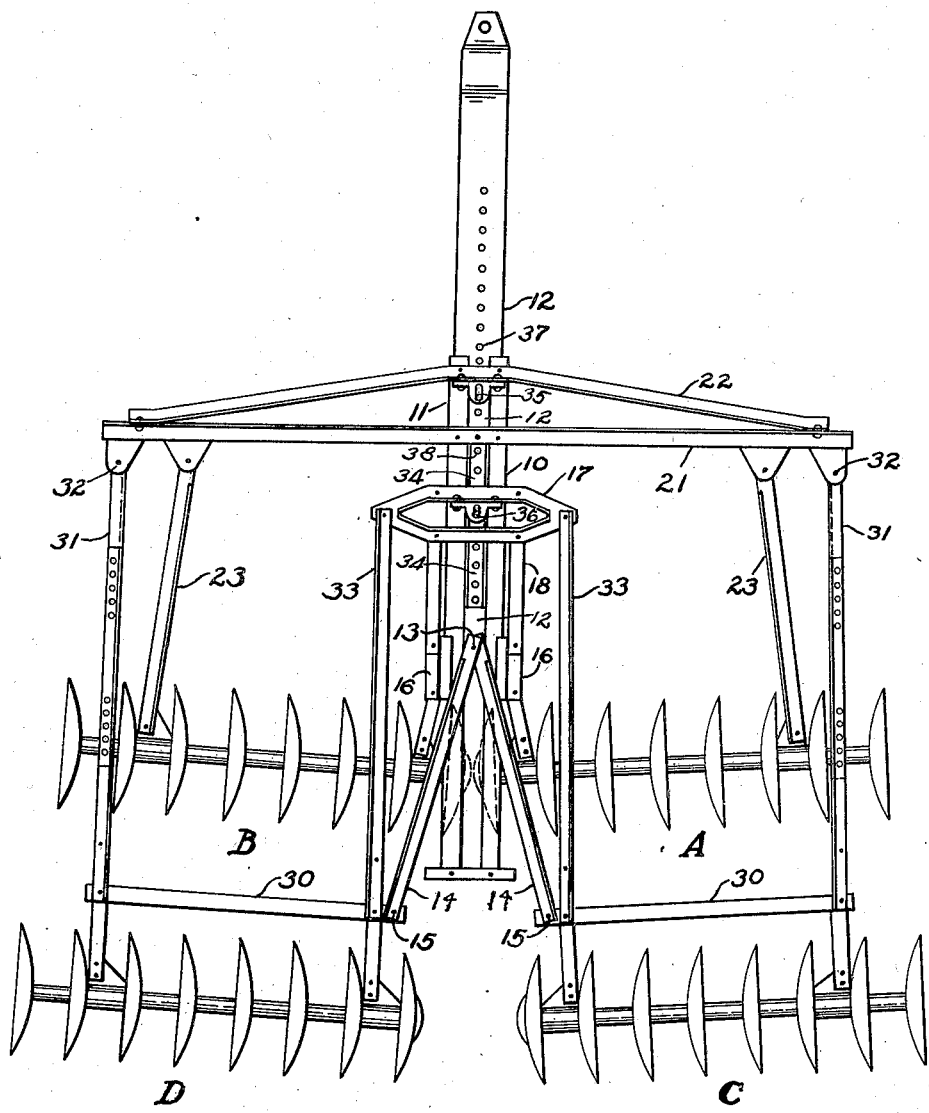
Fig. 2 is a top plan view of the harrow as shown in Figure 1 after having been moved to near its narrow position.

When members 16 and 17 are free to slide on the frame and draw bar 12 is moved forward links 14 will cause gangs C and D to move toward each other as shown in Figure 2. When this action takes place, links 33 and 19 will cooperate to cause sliding members 16 and 17 to move forward, which action will also reduce the angle of all four gangs. Thus the rear gangs may be widened and narrowed, and when they are in their narrow position the gangs will be in their inoperative position as shown in Figure 2, and when they are again moved to their wide position as illustrated in Figure 1 by backing the tractor they will assume an operative angle and position. When bar 12 is locked to frame members 10 and 11 and members 16 and 17 are free to move, any desired angle of the gangs may be secured simultaneously by simply moving the tractor backward or forward.

Draw bar 12 may be locked in a selected rear position by means of locking pin 35 which is adapted to engage any one of a series of orifices 37 in member 12 and the angle of the desired disks will then be held in the working position as illustrated in Figure 1, so long as member 17 is locked into position.

Thus it will be seen that my device is simple and that the gangs may be easily adjusted to the desired operating angle or moved to the narrow and wide positions at will, particularly so since trip ropes may be secured to locking pins 35 and 36 whereby the operator may make the desired changes without leaving the tractor seat.

Referring now specifically to Figure 7, it will be noted that gang C has been moved to the left side of the device and gang D has been moved to the right side of the device. This change may be made without difficulty. However, in order to give the rear gangs the desired angle and provide what is known as a tandem disk I have provided extension links 40—40 having a series of orifices whereby bars 31 may be lengthened whereby the rear gangs will have the desired angle but in the opposite direction to the front gangs.

It will be understood that various changes in details of construction may be made without departing from the spirit and scope of the invention and therefore I do not wish to be limited to the specific details above described.

Having thus shown and described my invention I claim:

1. A device of the class described, comprising a forwardly extending main frame and having central disk gangs and two end gangs at the rear end thereof, a transverse frame member secured to the front end of said main frame and having link connections from its ends to the outer ends of said end gangs, a slidably mounted member on the rear end of said main frame and having an operating connection to the inner ends of said center gangs, a slidably mounted member a distance in rear of said transverse member having a rigid connection to said other slidably mounted member and having link bar connections to the inner ends of said rear gangs, link connections between the outer ends of said center gangs and said transverse member, a draw bar slidably mounted in said frame, the front end being adapted to be connected to a tractor, the rear end having link connections to the inner ends of said end gangs.

2. A device of the class described, comprising a forwardly extending main frame having two central disk gangs and two end gangs at the rear end thereof, a transverse frame member secured to the front end of said main frame and having link connections from its ends to the outer ends of said end gangs, a slidably mounted member a distance in rear of said transverse member having link bar connections to the inner ends of said end gangs, and operating connections to the inner ends of said center gangs, link connections between the outer ends of said center gangs and said transverse member, a draw bar slidably mounted in said frame, the front end being adapted to be connected to a tractor, the rear end having link connections to the inner ends of said end gangs.

3. A device as recited in claim 2 including, detachable means for locking said draw bar to said main frame and detachable means for locking said slidably mounted member to said main frame.

4. A device of the class described, comprising a main frame having two center disk gangs and two end disks gangs at the rear end thereof, a transverse frame member secured to the front end of said main frame and having link connections from its ends to the outer ends of said end gangs, a slidably mounted member near the rear end of said main frame having operating connections to the inner ends of said center gangs, a slidably mounted member a distance in rear of said transverse member having a rigid connection to said other slidably mounted member and having link bar connections to the inner ends of said rear gangs, link connections between the outer ends of said center gangs and said transverse member, a draw bar slidably mounted in said frame, the front end being adapted to be connected to a tractor, the rear end having link connections to the inner ends of said end gangs, detachable means for locking said draw bar to said main frame and detachable means for locking said slidably mounted members whereby when said draw bar is in its rear position said end gangs will be operatively held in their wide position and whereby when said draw bar locking means is disengaged and the tractor is moved forward said end gangs will be moved in rear of said center gangs.

5. A device of the class described, comprising a main frame having two central disk gangs and two end gangs at the rear end thereof, a transverse frame member secured to the front end of said main frame and having link connections from its ends to the outer ends of said end gangs, a slidably mounted member in rear of said transverse member having locking means and link bar connections to the inner ends of said rear gangs and operating connections to the inner ends of said center gangs, link connections between the outer ends of said center gangs and said transverse member, a draw bar slidably mounted in said frame having locking means therefor, the front end being adapted to be connected to a tractor, the rear end having link connections to the inner ends of said end gangs whereby when said first locking means is disengaged and the tractor is moved forward or rearward, the angle of said gangs will be increased or decreased simultaneously, and whereby when said second locking means only is disengaged and the tractor is moved forward and backward said end gangs will move in rear of said center gangs and outward again into operating position.

6. A device of the class described, comprising a main frame having two central disk gangs and two end gangs at the rear end thereof, a transverse member secured to the front end of said main frame and having link connections from its ends to the outer ends of said end gangs, a slidably mounted member near the rear end of said main frame having an operating connection to the inner ends of said center gangs, a slidably mounted member a distance in rear of said transverse member and having a link connection to said other slidably mounted member and having link bar connections to the inner ends of said rear gangs, means for locking said slidable members, link connections between the outer ends of said center gangs and said transverse member, a draw bar slidably mounted in said frame having locking means therefor, the front end being adapted to be connected to a tractor, the rear end having link connections to the inner ends of said end gangs whereby when each of said locking means is disengaged and the tractor is moved forward said end gangs will be moved in rear of said center gangs and all of said gangs will be moved in transverse or inoperative positions.

7. A tractor drawn type disk harrow of the class described, comprising a main frame having a transverse member secured to its forward end, two center gangs near the rear end of said frame and two end gangs in rear transversely of said center gangs, link connections from the end of said transverse member to the outer ends of said end gangs, link connections from the outer ends of said center gangs to said transverse member, a draw bar slidably mounted in said frame adapted to be connected to the tractor and instrumentalities connected thereto whereby a forward movement of the tractor may move said end gangs to a position in rear of said center gangs and whereby a further forward movement of the tractor may cause said front and end gangs to move to a position transverse to the direction of travel.

CHARLES VERN EVERETT.